(12) United States Patent
Webster et al.

(10) Patent No.: US 9,188,180 B2
(45) Date of Patent: Nov. 17, 2015

(54) BRAKE ROTOR AND METHOD OF MANUFACTURING THE SAME

(71) Applicant: GM GLOBAL TECHNOLOGY OPERATIONS LLC, Detroit, MI (US)

(72) Inventors: James A. Webster, Shelby Township, MI (US); Tomasz Warzecha, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 13/892,384

(22) Filed: May 13, 2013

(65) Prior Publication Data

US 2014/0332329 A1 Nov. 13, 2014

(51) Int. Cl.
*F16D 65/12* (2006.01)
*F16D 65/02* (2006.01)

(52) U.S. Cl.
CPC .............. *F16D 65/123* (2013.01); *F16D 65/12* (2013.01); *F16D 2065/1316* (2013.01); *F16D 2065/1344* (2013.01)

(58) Field of Classification Search
CPC .................. F16D 65/123; F16D 65/12; F16D 2065/1316; F16D 2065/1344
USPC ............... 188/218 XL, 17, 18 R, 18 A, 250 B
See application file for complete search history.

(56) References Cited

U.S. PATENT DOCUMENTS

| | | | | |
|---|---|---|---|---|
| 2,603,316 A * | 7/1952 | Pierce | ...................... | 188/218 XL |
| 2,745,518 A * | 5/1956 | Bachman | ................ | 188/218 XL |
| 2,769,512 A * | 11/1956 | Tack | ........................ | 188/218 XL |
| 6,053,290 A * | 4/2000 | Goddard | ................ | 188/264 AA |
| 6,401,880 B1 | 6/2002 | Zahdeh | | |
| 7,568,560 B2 * | 8/2009 | Lin | ........................ | 188/218 XL |
| 7,677,368 B2 * | 3/2010 | Tedesco et al. | ......... | 188/218 XL |
| 7,975,750 B2 | 7/2011 | Dessouki et al. | | |
| 8,245,758 B2 | 8/2012 | Hanna et al. | | |
| 2008/0060890 A1 * | 3/2008 | Clark et al. | .............. | 188/218 XL |
| 2010/0051397 A1 * | 3/2010 | Kim et al. | ............... | 188/218 XL |
| 2010/0065388 A1 * | 3/2010 | Kleber | .................... | 188/218 XL |
| 2010/0206675 A1 | 8/2010 | Miyake et al. | | |
| 2013/0048448 A1 * | 2/2013 | Hanna et al. | ............ | 188/218 XL |

FOREIGN PATENT DOCUMENTS

| | | |
|---|---|---|
| DE | 2235627 A1 | 1/1974 |
| DE | 2358140 A1 | 6/1975 |
| DE | 4420758 A1 | 12/1995 |
| DE | 10312954 B3 | 6/2004 |
| DE | 102008054397 A1 | 6/2010 |
| DE | 102010001970 A1 | 8/2010 |

* cited by examiner

*Primary Examiner* — Melanie Torres Williams
(74) *Attorney, Agent, or Firm* — Quinn Law Group, PLLC

(57) ABSTRACT

A brake rotor for an automotive vehicle braking system includes a brake rotor hat having a generally circular mounting portion, a generally cylindrical wall connected to the mounting portion and being generally symmetrical about an axis, and first and second pluralities of fingers extending radially outward from the wall. Each of the first plurality of fingers and each of the second plurality of fingers has a respective terminal end portion. The terminal end portions of the first plurality of fingers are coplanar about a first plane. The terminal end portions of the second plurality of fingers are not coplanar about the first plane, and are coplanar about a second plane that is parallel with the first plane. A rotor cheek may be cast around the fingers.

12 Claims, 3 Drawing Sheets

BRAKE ROTOR AND METHOD OF MANUFACTURING THE SAME

TECHNICAL FIELD

This invention relates to a coulomb damped disc brake rotor and a method of manufacturing coulomb damped disc brake rotors.

BACKGROUND

A disc brake rotor for a motor vehicle typically includes a rotor hat for connecting to an axle hub and wheel of the motor vehicle. An annular rotor cheek is connected to the rotor hat and defines a pair of mutually opposed braking surfaces onto which brake pads are selectively applied when braking is desired. The rotor cheek may be solid or vented. Vented rotor cheeks includes a web of ventilation vanes between the braking surfaces to increase surface area and heat transfer from the brake rotor.

A disc brake system typically includes a caliper that supports a mutually opposed pair of brake pads, with each brake pad overlying a respective rotor cheek braking surface. The brake system selectively resists rotation of the wheel by causing the caliper to press the brake pads upon the braking surfaces of the one or more rotor cheeks. Frictional interaction between the one or more rotating rotor cheeks and non-rotating brake pads causes braking of the motor vehicle.

SUMMARY

A brake rotor for an automotive vehicle braking system includes a brake rotor hat having a generally circular mounting portion, a generally cylindrical wall connected to the mounting portion and being generally symmetrical about an axis, and first and second pluralities of fingers extending radially outward from the wall. Each of the first plurality of fingers and each of the second plurality of fingers has a respective terminal end portion. The terminal end portions of the first plurality of fingers are coplanar about a first plane. The terminal end portions of the second plurality of fingers are not coplanar about the first plane, and are coplanar about a second plane that is parallel with the first plane.

The first and second pluralities of fingers capture a coulomb damping ring and provide surfaces through which an attached rotor cheek can transmit torque to the wheel and wheel hub via the rotor hat. The shape of the rotor hat enables the hat to be formed by stamping, thereby reducing material costs and manufacturing costs.

A corresponding method of producing a brake rotor is also provided.

The above features and advantages and other features and advantages of the present invention are readily apparent from the following detailed description of the best modes for carrying out the invention when taken in connection with the accompanying drawings.

DETAILED DESCRIPTION

Figure 1:
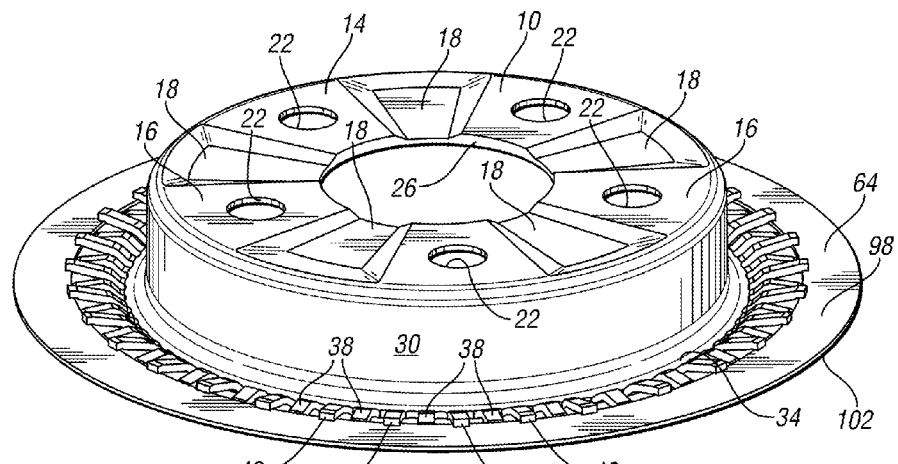
FIG. 1 is a schematic, perspective view of a rotor hat with a coulomb damping ring connected thereto.
Figure 2:
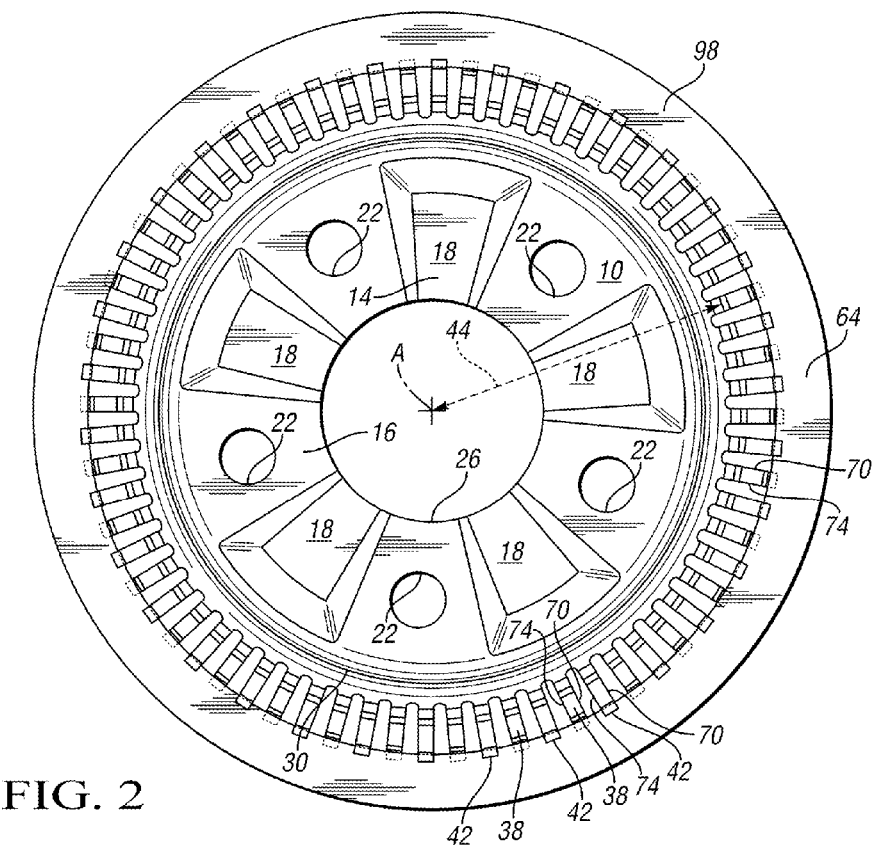
FIG. 2 is a schematic, top view of the rotor hat and coulomb damping ring of FIG. 1.
Figure 3:
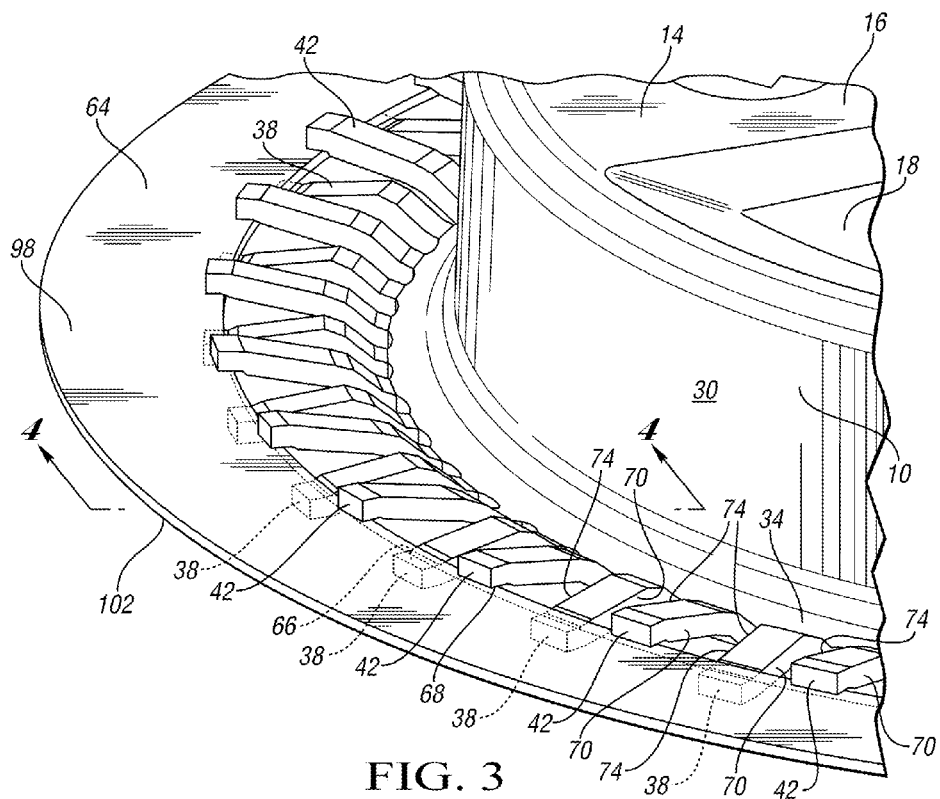
FIG. 3 is a schematic, perspective view of a portion of the hat and coulomb damping ring of FIGS. 1 and 2.
Figure 6:
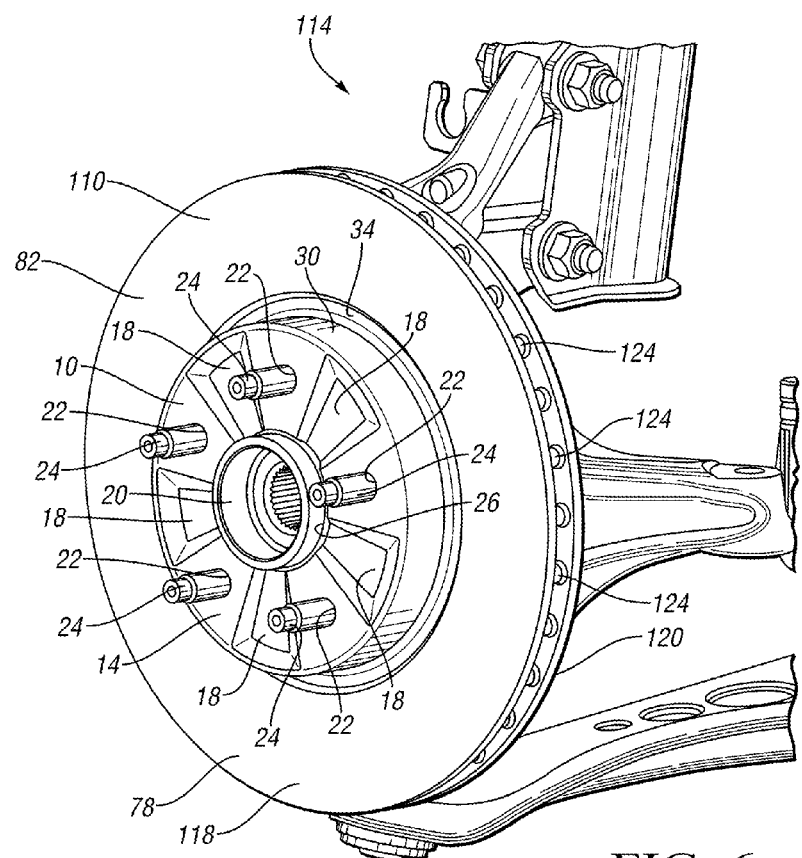
FIG. 6 is a schematic, perspective view of the rotor hat and rotor cheek connected to a vehicle suspension system.

Referring to FIGS. 1-3, a brake rotor hat 10 includes a generally circular mounting portion 14 at which the rotor hat 10 is connectable to a wheel hub (shown at 20 in FIG. 6). The mounting portion 14 has a generally circular surface 16 that, in the embodiment depicted, defines a plurality of strengthening indentations or concavities 18. The mounting portion 14 also defines apertures 22 for receiving fasteners (shown at 24 in FIG. 6) for attachment to a vehicle wheel and an aperture 26 for alignment with the wheel hub.

The rotor hat 10 also includes a generally cylindrical wall 30 connected to the mounting portion 14. The wall 30 has an end 34 that is distal from the mounting portion 14. Referring specifically to FIG. 2, the wall 30 is symmetrical about an axis A. The aperture 26 for alignment with the wheel hub 20 has its center point on axis A. The apertures 22 are evenly-spaced on the circumference of a circle having its center point on axis A. Generally circular surface 16 has its center point on axis A.

Referring again to FIGS. 1-3, the rotor hat 10 includes a first plurality of fingers 38 and a second plurality of fingers 42 that extend radially outward (relative to axis A) from the end 34 of the cylindrical wall 30. In the embodiment depicted, fingers 38 are evenly-spaced from one another around the entire circumference of the wall 30 at end 34, and fingers 42 are evenly-spaced from one another around the entire circumference of the wall 30 at end 34. Fingers 38 and fingers 42 extend radially from the end 34 in an alternating arrangement; thus, as one goes around the circumference of edge 34, one of the fingers 38 will be followed by one of the fingers 42, which in turn will be followed by one of the fingers 38, etc. It should be noted that, in the embodiment depicted, each of the fingers 38 is substantially identical to the other fingers 38 in size and shape; similarly, each of the fingers 42 is substantially identical to the other fingers 42 in size and shape.

Figure 4:
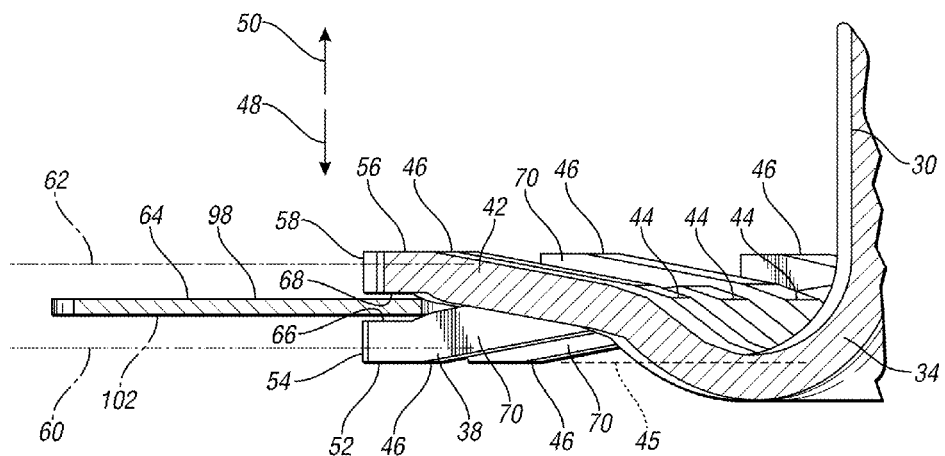
FIG. 4 is a schematic, sectional, side view of a portion of the hat and coulomb damping ring of FIGS. 1-3.

Referring to FIG. 4, wherein like reference numbers refer to like components from FIGS. 1-3, all of the fingers 38, 42 are coplanar with each other at radial distances between the end 34 of the wall 30 and radial distance 44 from the axis. In other words, in the embodiment depicted, all of the fingers 38, 42 have approximately the same size, shape, and orientation between the end 34 and a predetermined radial distance 44 from the axis A. Thus, adjacent the end 34 of the wall 30, the fingers 38, 42 are coplanar about plane 45, which is perpendicular to the axis A.

At radial distances greater than radial distance 44, but less than radial distance 46 from the axis A, fingers 38 and fingers 42 diverge axially; i.e. between radial distance 44 and radial distance 46, the fingers 38 extend increasingly in a first axial direction 48 with increasing radial distance from the axis A, whereas fingers 42 extend increasingly in a second axial direction 50 opposite the first axial direction 48 with increasing distance from the axis A.

At radial distances greater than distance 46, the axial positions of fingers 38, 42 do not vary with radial distance. Each of fingers 38, 42 has a respective terminal end portion 52 that, in the embodiment depicted, extends from radial distance 46 to the finger's respective tip 54. Similarly, each of fingers 42 has a respective terminal end portion 56 that, in the embodiment depicted, extends from radial distance 46 to the finger's respective tip 58.

The terminal end portions 52 of the first plurality of fingers 38 are coplanar about a first plane 60 that, in the embodiment depicted, is perpendicular to the axis A. The terminal end portions 56 of the second plurality of fingers 42 are not coplanar about the first plane 60, and are coplanar about a second plane 62 that is parallel with, and spaced axially apart from, the first plane 60.

This axial divergence of the first plurality of fingers 38 from the second plurality of fingers 42 provides a space for an annular member 64 that is disposed between the first and second planes 60, 62. The annular member 64 is a coulomb damper, which will absorb vibrations from the rotor cheek (shown at 78 in FIG. 6) and thereby reduce or eliminate brake squeal. The first plurality of fingers 38 limits movement of the annular member 64 in the first axial direction 48, and the second plurality of fingers 42 limits movement of the annular member 64 in the second axial direction 50, thereby retaining the annular member relative 64 to the rotor hat 10.

More specifically, each of the first plurality of fingers 38 defines a respective stop surface 66 on the terminal end portion 52 that faces the second axial direction 50; each of the second plurality of fingers 42 defines a respective stop surface 68 that faces the first axial direction 48. The annular member 64 is disposed such that axial movement of the annular member 64 in the first axial direction 48 is restricted by contact between the annular member 64 and the stop surfaces 66 of the first plurality of fingers 66, and axial movement of the annular member 64 in the second axial direction 50 is restricted by contact between the annular member 64 and the stop surfaces 68 of the second plurality of fingers 42.

In the embodiment depicted, the rotor hat 10, including the mounting portion 14, the wall 30, and the fingers 38, 42, is formed from a single piece of metal, and, more specifically, from a single piece of stainless steel. The shape of the rotor hat 10 enables the hat 10 to be formed by stamping. Thus, the rotor hat 10 may be light-weight and inexpensive to manufacture.

The fingers 38, 42 provide an interlocking system at which the rotor cheek 78 is attached to the rotor hat 10 and through which torque may be transferred between the rotor hat 10 and the rotor cheek 78. More specifically, and with reference to FIGS. 2 and 3, each of the fingers 38, 42 includes respective torque transmission surfaces 70, 74 that are positioned such that a force exerted on any one of the torque transmission surfaces 70, 74 urges the rotor hat 10 to rotate about the axis A. Each of the surfaces 70, 74 in the embodiment depicted is perpendicular to planes 60, 62 and surfaces 66, 68. A force normal to one of the surfaces 70, and acting on one of the surfaces 70, will urge the rotor hat to rotate about the axis A in a first rotational direction; a force normal to one of the surfaces 74, and acting on one of the surfaces 74, will urge the rotor hat to rotate about the axis A in a second rotational direction opposite the first rotational direction.

Figure 5:
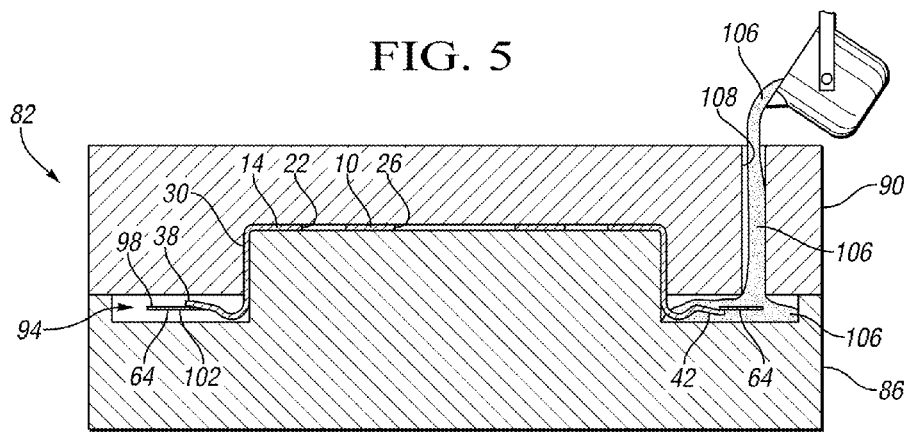
FIG. 5 is a schematic, cross-sectional side view of the rotor hat and coulomb damping ring of FIGS. 1-4 inside a mold during the process of casting a rotor cheek around a portion of the rotor hat and coulomb damping ring.

FIG. 5 depicts a method and apparatus for forming the rotor cheek 78 and attaching the rotor cheek 78 to the rotor hat 10. Referring to FIG. 5, wherein like reference numbers refer to like components from FIGS. 1-4, the rotor cheek is formed by being cast around the fingers 38, 42. More specifically, the method includes providing a mold 82 that has lower and upper mold portions 86, 90. The lower and upper mold portions 86, 90 cooperate to form a chamber 94 therebetween when the mold portions 86, 90 are closed together, as shown in FIG. 5. The chamber 94 has the general shape of the rotor cheek 78. The mold 82 in the embodiment depicted is formed from sand.

The method also includes positioning the rotor hat 10 such that the first and second pluralities of fingers 38, 42 are disposed within the chamber 94, as shown in FIG. 5. The annular member 64 is preferably a pre-manufactured steel component having a coating on opposing surfaces 98, 102. These coated surfaces 98, 102 do not bond with the casting material 106 during the casting operation shown in FIG. 5. The lack of "wetting" or affinity along these coated surfaces 98, 102 produces an unbonded interfacial boundary between the annular member 64 and the rotor cheek desired for damping effectiveness. Since the coated surfaces 98, 102 of the annular member 64 do not bond with the casting material 106 of the rotor cheek 78, a proper interfacial boundary is formed with the rotor cheek 78 for damping.

The annular member 64 and the rotor hat 10 may be formed from any materials having a melting point higher than that of casting material 106, such that the hat 10 and the member 64 would not be melted during the casting process. In one embodiment, the casting material 106 is iron and, as mentioned hereinabove, the hat 10 is formed of stainless steel and the annular member 64 is formed of steel.

The coated surfaces 98, 102 are cleaned free of oil, rust or dirt prior to applying the coating thereto. Degreasers may be used to remove thin films of oil, and steel wool may be used to remove rust. Sand blasting may be used to removes both oil and rust, and to roughen the surfaces, which promotes adherence of the coating. In one embodiment, the coating material is a ceramic mold wash that has alumina and silica particles mixed with an organic binder. It is approximately 47.5% alumina and 39.8% silica with a lignisole (lignosulfanate) binder. The coating preferably has a thickness between approximately 50 and 300 micrometers. It should be noted that other ceramic coatings that prevent wetting of the annular member 64 and having a melting point higher than that of the casting material 106 may be used. Additionally, non-ceramic coatings such as those with hydrocarbon based carriers may be used while remaining within the scope of that which is claimed.

Once the member 64 is cleaned and free of oil and other contaminates, it is dipped in or sprayed with the ceramic mold wash on both surfaces 98, 102 and allowed to air dry. The member 64 is then placed in an oven at 500 degrees F. for 45 minutes to reduce the amount of absorbed water and organic binders within the ceramic coating, and to provide a relatively uniform coating. However, it should be noted that alternate coatings may require alternate drying procedures. The thickness of the annular member 64 is chosen to prevent bending or flexing of the annular member 64 while not being so thick as to "chill" the surrounding molten casting material 106 during casting to the point that an objectionable amount of carbide is produced.

The method further includes causing the molten casting material 106 to enter and fill the mold chamber 94, as shown in FIG. 5. In the embodiment depicted, the upper mold portion 90 defines passage 108 through which the molten casting material 106 may be poured into the chamber 94. When the casting material 106 fills the chamber 94, the casting material 106 substantially encapsulates the annular member 64 and fills the spaces between, around, and among the first and second pluralities of fingers 38, 42. Thus, the casting material 106, and therefore the hardened rotor cheek 78, contacts the torque transmission surfaces 70, 74 on each of the fingers 38, 42 so that torque is transmissible between the rotor cheek 78 and the hat 10. When the casting material 106 cools and solidifies, it forms the cheek 78 mounted to the hat 10. The hat 10 and the cheek 78 together cooperate to form a brake rotor (shown at 110 in FIG. 6).

Referring to FIG. 6, wherein like reference numbers refer to like components from FIGS. 1-5, the brake rotor 110 is shown attached to a suspension system 114 and wheel hub 20. The wheel hub 20 extends partially through the central aperture 26 of the mounting portion 14, and fasteners 24 extend through respective apertures 22 to retain the rotor 110 to the hub 20 and suspension 114. In the embodiment depicted, the rotor cheek 78 is generally annular and defines two planar braking surfaces 118, 120. The rotor cheek 78 is vented and thus includes a plurality of vanes 124 that interconnect the planar braking surfaces 118, 120, though a solid rotor may be employed within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A brake rotor for an automotive vehicle braking system comprising:
   a brake rotor hat having a generally circular mounting portion, a generally cylindrical wall connected to the mounting portion and being generally symmetrical about an axis, and first and second pluralities of fingers extending radially outward from the wall;
   wherein each of the first plurality of fingers and each of the second plurality of fingers has a respective terminal end portion;
   wherein the terminal end portions of the first plurality of fingers are coplanar about a first plane;
   wherein the terminal end portions of the second plurality of fingers are not coplanar about the first plane, and are coplanar about a second plane that is parallel with the first plane;
   wherein each of the fingers includes respective torque transmission surfaces that are positioned such that a force exerted on any one of the torque transmission surfaces urges the rotor hat to rotate about the axis;
   a rotor cheek that contacts each of the torque transmission surfaces; and
   an annular member disposed between the first plane and the second plane.

2. The brake rotor of claim 1,
   wherein the first plurality of fingers limits movement of the annular member in a first axial direction, and the second plurality of fingers limits movement of the annular member in a second axial direction.

3. The brake rotor of claim 2, wherein each of the first plurality of fingers defines a respective stop surface that faces the second axial direction;
   wherein each of the second plurality of fingers defines a respective stop surface that faces the first axial direction;
   wherein the annular member is disposed such that axial movement of the annular member in the first axial direction is restricted by contact between the annular member and the stop surfaces of the first plurality of fingers, and axial movement of the annular member in the second axial direction is restricted by contact between the annular member and the stop surfaces of the second plurality of fingers.

4. The brake rotor of claim 3, wherein the rotor hat is formed from a single piece of metal.

5. The brake rotor of claim 4, wherein the metal is stainless steel.

6. The brake rotor of claim 1, wherein the annular member includes a first surface that faces the first axial direction and a second surface that faces the second axial direction; and
   wherein the rotor cheek sufficiently surrounds the annular member such that the rotor cheek contacts the first and second surfaces.

7. The brake rotor of claim 1, wherein each of the first plurality of fingers and each of the second plurality of fingers is coplanar with the other fingers adjacent the wall.

8. A method of producing a brake rotor comprising:
   providing a brake rotor hat having a generally circular mounting portion, a generally cylindrical wall connected to the mounting portion and being generally symmetrical about an axis, and first and second pluralities of fingers extending radially outward from the wall;
   wherein each of the first plurality of fingers and each of the second plurality of fingers has a respective terminal end portion;
   wherein the terminal end portions of the first plurality of fingers are coplanar about a first plane;
   wherein the terminal end portions of the second plurality of fingers are not coplanar about the first plane, and are coplanar about a second plane that is parallel with the first plane;
   wherein an annular member is disposed between the first and second planes; and
   casting a rotor cheek around the first and second pluralities of fingers and the annular member.

9. The method of claim 8, wherein casting the rotor cheek includes providing a mold defining a chamber having the general shape of the rotor cheek;
   positioning the rotor hat so that the first and second pluralities of fingers and the annular member are disposed within the chamber; and
   pouring molten casting material into the chamber.

10. The method of claim 9, wherein the annular member is disposed within the chamber between the first and second planes such that the molten casting material contacts the annular member.

11. The method of claim 10, wherein the first plurality of fingers limits movement of the annular member in a first axial direction, and the second plurality of fingers limits movement of the annular member in a second axial direction.

12. The method of claim 11, wherein each of the fingers includes respective torque transmission surfaces that are positioned such that a force exerted on any one of the torque transmission surfaces urges the rotor hat to rotate about the axis; and
   wherein the molten casting material contacts each of the torque transmission surfaces.

* * * * *